United States Patent
Nakamura et al.

(10) Patent No.: US 7,601,381 B2
(45) Date of Patent: Oct. 13, 2009

(54) POLYSACCHARIDES AND PROTEIN CONJUGATE, AND EMULSIFIERS AND EMULSIONS CONTAINING IT

(75) Inventors: Akihiro Nakamura, Ibaraki (JP); Ryuji Yoshida, Ibaraki (JP); Hirokazu Maeda, Ibaraki (JP)

(73) Assignee: Fuji Oil Company, Limited, Osaka (JP)

( * ) Notice: Subject to any disclaimer, the term of this patent is extended or adjusted under 35 U.S.C. 154(b) by 296 days.

(21) Appl. No.: 11/571,953

(22) PCT Filed: Jul. 8, 2005

(86) PCT No.: PCT/JP2005/012656

§ 371 (c)(1),
(2), (4) Date: Jan. 11, 2007

(87) PCT Pub. No.: WO2006/006521

PCT Pub. Date: Jan. 19, 2006

(65) Prior Publication Data

US 2008/0009606 A1    Jan. 10, 2008

(51) Int. Cl.
*A23J 1/00* (2006.01)
*C07K 1/00* (2006.01)
(52) U.S. Cl. ...................... 426/656; 530/350
(58) Field of Classification Search ............ 426/656; 530/350
See application file for complete search history.

(56) References Cited

FOREIGN PATENT DOCUMENTS

| | | |
|---|---|---|
| JP | 63-36748 | 2/1988 |
| JP | 6-121922 | 5/1994 |
| JP | 09-107886 | 4/1997 |
| JP | 2001046851 A | 2/2001 |

OTHER PUBLICATIONS

Yoshii et al., Biosci. Biotech. Biochem., 60(9), 1406-1409, 1996.*
Averyhart-Fullard, V. et al., "A hydroxyproline-rich protein on the soybean cell wall", Proc. Natl. Acad. Sci. USA, (1988), vol. 85, pp. 1082 to 1085, full text.
Cassab, G.I. et al., "A developmentally regulated hydroxyproline-Rich Glycoprotein from the Cell Walls of Soybean Seed Coats", Plant Physiol., (1985), vol. 77, pp. 532 to 535, full text.
Nakamura A et al: "Competitive Adsorption of Soy Soluble Polysaccharides in Oil-in-Water Emulsions" Jan. 1, 2004 (Jan. 1, 2004), Food Research International, Elsevier Applied Science, Barking, GB, pp. 823-831.
Database WPI Week 200137, Thomson Scientific, London, GB; Publication No. 2001046851, English abstract of JP 2001 046851 A (Fuji Seiyu KK) Feb. 20, 2001 (Feb. 20, 2001).
Nakamura A, Yoshida R, Maeda H, Furuta H, Corredig M: "Study of the Role of the Carbohydrate and Protein Moieties of Soy Soluble Polysaccharides in their Emulsifying Properties" Journal of Agricultural and Food Chemistry, vol. 52, No. 17, Jul. 30, 2004 (Jul. 30, 2004) pp. 5506-5512.

* cited by examiner

*Primary Examiner*—Maryam Monshipouri
(74) *Attorney, Agent, or Firm*—Paul & Paul

(57) ABSTRACT

Emulsifying agents of the natural polyvmer type, especially polysaccharide type, attain excellent emulsion stability and give a stable emulsion. However, their emulsifying power is not always high and these emulsifying agents have been still insufficient in giving an emulsion having a small particle diameter. A polymer-type emulsifying agent is provided which has high emulsifying power and with which an emulsion having a small emulsified-particle diameter can be obtained. The emulsifying agent, which is of the natural polymer type having high emulsifying power, is an emulsifying agent containing as an active ingredient a composite of a polysaccharide with a specific protein which was contained in soybean and has a proline content of 10% or higher and a molecular weight of 50,000-80,000 Da.

7 Claims, 2 Drawing Sheets

[FIG. 1]
[図1]
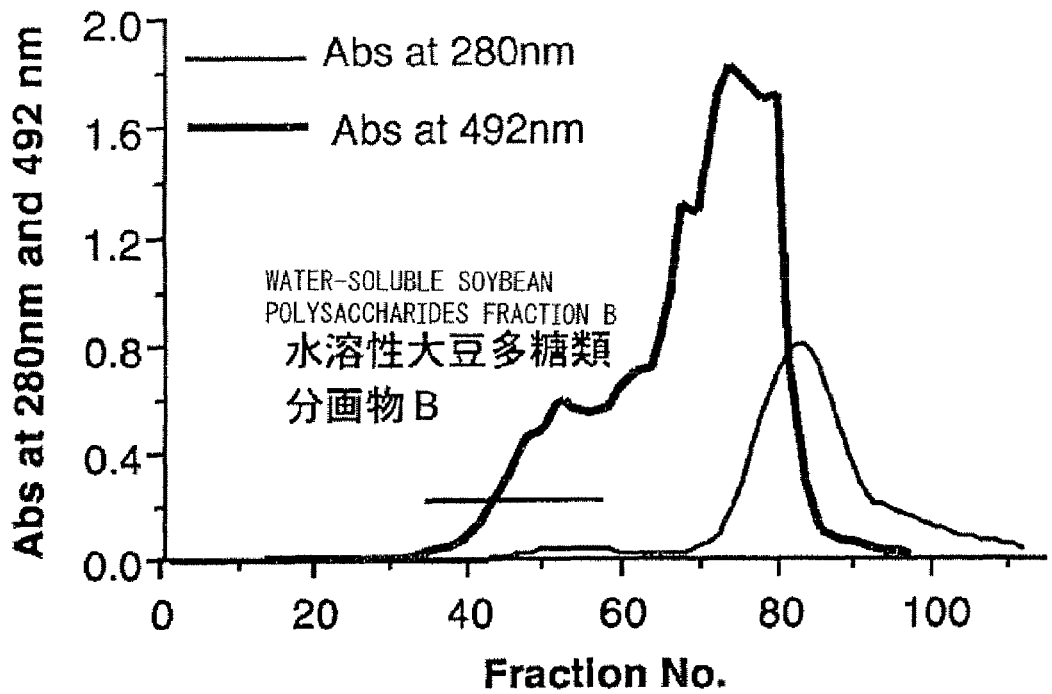
[FIG. 2]
[図2]
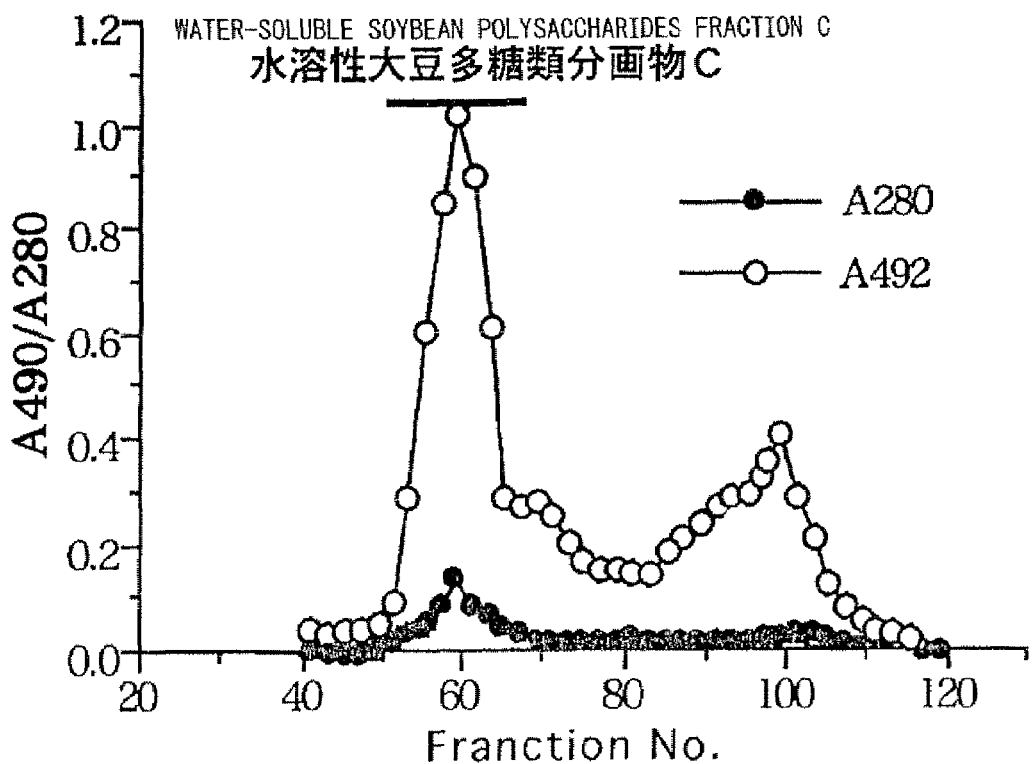

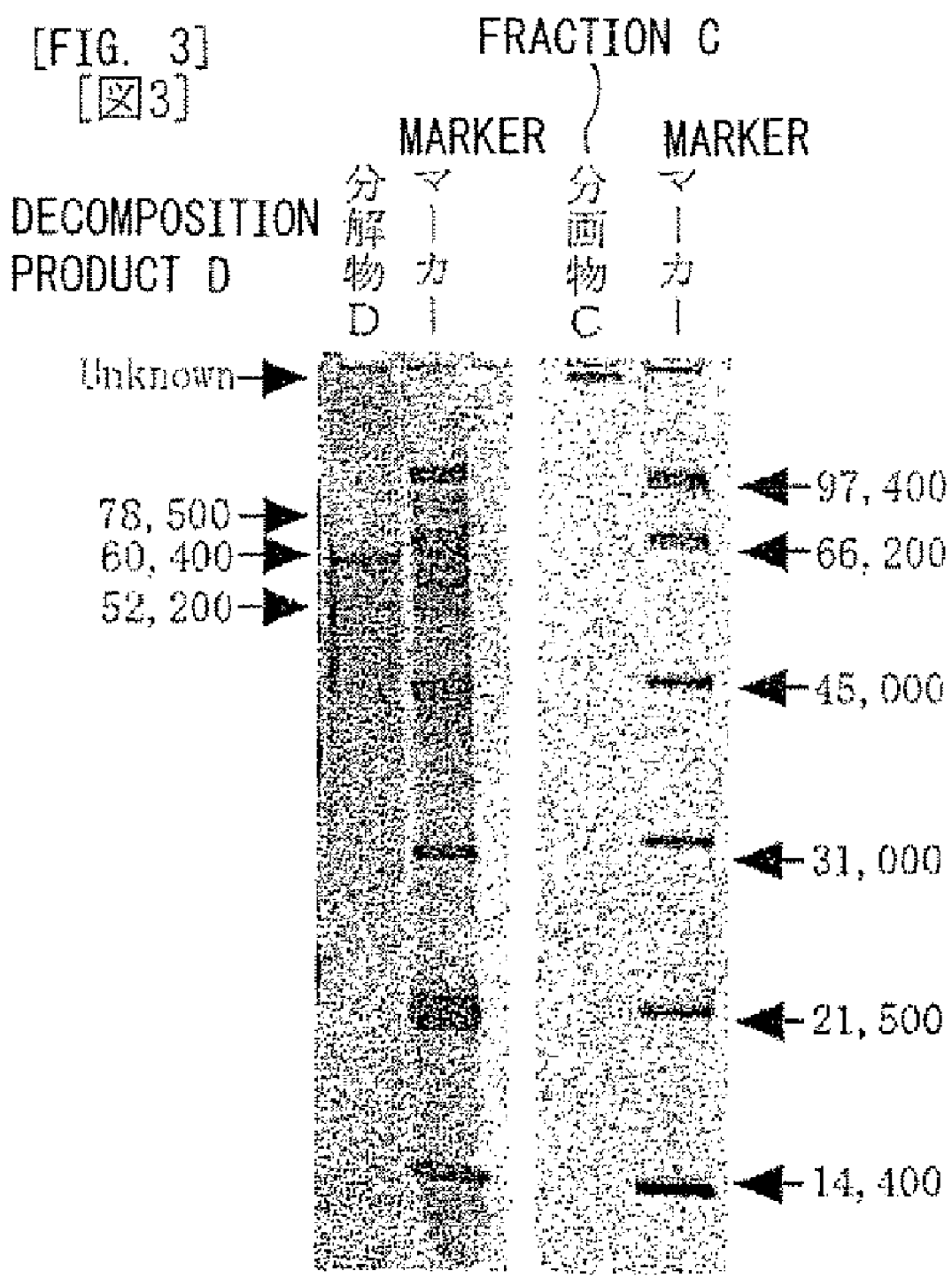
[FIG. 3]

POLYSACCHARIDES AND PROTEIN CONJUGATE, AND EMULSIFIERS AND EMULSIONS CONTAINING IT

This application is a 371 of PCT/JP05/12656 filed Jul. 8, 2005, which claims priority to Japanese Application 2004-205351, filed Jul. 13, 2004.

TECHNICAL FIELD

The present invention relates to naturally-derived emulsifiers with enhanced emulsifying power, and specifically it relates to a soybean-derived protein and polysaccharides conjugate and to emulsifiers and emulsions containing it.

BACKGROUND ART

Emulsifiers used in food products include surfactants such as soybean lecithin, glycerin fatty acid esters, sucrose fatty acid esters and the like. These low molecular emulsifiers are widely used for preparation of oil-in-water emulsions which have oil stably dispersed in an aqueous phase, forming stably dispersed emulsions with the hydrophobic regions in the emulsifiers adsorbed onto the oil-phase interface and the hydrophilic regions directed toward the aqueous phase. These emulsifiers exhibit very powerful emulsifying power, allowing preparation of satisfactory emulsions with small emulsified particle sizes.

Such emulsions maintain stable emulsified states when used under non-diluted conditions such as in creams. However, in the case of food products consisting of highly diluted emulsions, such as emulsified flavorings in beverages, the emulsified state readily disintegrates and the heating stability and acid stability which are a requirement for emulsifiers are insufficient, and for these reasons they have not been used very much in practice.

Currently, gum arabic is commonly used as a natural macromolecular emulsifier for emulsified flavorings (Non-patent documents 1-2).

Gum arabic is reported to be a glycoprotein comprising a polypeptide chain composed of hydroxyproline and serine as the major constituent amino acids bonded to an arabinogalactan chain consisting of the acidic sugar glucuronic acid and its 4-O-methylated form as constituent sugars (Non-patent document 3).

The sugar chains of gum arabic function as hydrophilic groups while the polypeptides bonded to the sugar chains function as hydrophobic groups, thereby stabilizing O/W emulsions (Non-patent document 4).

The sugar chains of emulsions prepared using gum arabic form thick hydrophilic layers at oil droplet interfaces, and since there is little separation of the gum arabic at the oil droplet interfaces even with high degrees of dilution, it is an excellent emulsifier for emulsified flavorings. However, because the Acacia sap gum arabic is only produced in certain regions and is susceptible to weather conditions, it has not been possible to sustain stable volumes and prices.

On the other hand, soybean-derived water-soluble polysaccharides function as natural macromolecular emulsifiers (Patent document 1), and are used in the field of food products as a substitute for the emulsifier function of gum arabic. However, the "emulsifying power" for obtaining emulsions with small particle sizes is currently insufficient compared to synthetic low molecular emulsifiers and the like, and therefore a need exists for natural macromolecular emulsifiers that exhibit not only high emulsifying stability but also strong emulsifying power. Conjugation of proteins and sugars by aminocarbonyl reaction has been proposed as a method of improving functions such as emulsification (Patent document 2), but this is still impractical in terms of both production and function.

Patent document 1: Japanese Unexamined Patent Publication No. 6-121922
Patent document 2: Japanese Unexamined Patent Publication No. 9-107886
Non-patent document 1: Ray et al., Food Hydrocolloids, 9(2), 123-131, 1995
Non-patent document 2: Trubiano, Flavor Technology: ACS Symposium Series 610. Washington D.C.: American Chemical Society. P198-209, 1995
Non-patent document 3: Williams, P. A. et al., Gum arabic. In Handbook of hydrocolloids
Non-patent document 4: Glicksman, Food Hydrocolloids. Boca Raton, Fla.: CRC Press. P7-30, 1983

DISCLOSURE OF THE INVENTION

Problems to be Solved by the Invention

Natural macromolecular emulsifiers have excellent emulsifying stability allowing emulsions to be rendered stable for long periods, but much room for improvement still remains in regard to "emulsifiability" for reducing emulsified particle sizes. It is an object of the present invention to provide natural macromolecular emulsifiers with improved "emulsifiability" in order to obtain emulsions with small emulsified particle sizes.

Means for Solving the Problems

As a result of much diligent research on water-soluble soybean polysaccharides as natural macromolecular emulsifiers to improve emulsifiabilty, with the goal of solving the problems described above, the present inventors obtained a fraction from soybean in which polysaccharides form conjugates with specific proteins and discovered that these conjugates of polysaccharides with specific proteins having high proline contents contribute to the emulsifying function of water-soluble soybean polysaccharides, on which discovery the present invention has been completed.

Specifically, the invention provides a soybean-derived conjugate comprising polysaccharides and a protein having an amino acid composition of $\geq 10\%$ proline, which are found in soybean, wherein the molecular weight of the protein forming the conjugate is composed mainly of the fraction from 50,000 Da to 80,000 Da, the conjugate contains the protein at 3% or greater, the polysaccharides forming the conjugate is acidic polysaccharides containing at least 20 wt% galacturonic acid as a constituent sugar, and the molecular weight of the conjugate is 100,000 Da or greater. The invention further provides emulsifiers comprising the conjugate as an active ingredient and emulsions containing the conjugate.

Effect of the Invention

According to the invention, it is possible to obtain emulsifiers with improved emulsifying power, allowing formation of emulsions with small emulsified particle sizes using a natural macromolecular compound composition.

BEST MODE FOR CARRYING OUT THE INVENTION

The protein and polysaccharides conjugate according to the invention is composed of two components, polysaccharides and protein. The polysaccharides is preferably any of various polysaccharides obtained from soybean as the source, but the source is not necessarily limited to soybean. These polysaccharides are also preferably acidic polysaccharides containing at least 20 wt % galacturonic acid as the main constituent sugar, and the molecular weight of the glycoprotein conjugate is preferably 100,000 Da or greater. A smaller molecular weight will tend to reduce the function of the macromolecular emulsifier, while lower acidic sugars content among the constituent sugars will tend to reduce electrostatic repulsion between the emulsion particles, thus leading to inferior emulsifiability.

The protein as one of the components of the conjugate is the protein of a specific fraction in soybean, and it has a proline content of 10 wt % or greater and more preferably 15% or greater among its constituent amino acids. Soybean protein usually contains 5-6% proline overall, and even well-known soybean protein components contain proline at about 7% as 11S globulin or basic 7S globulin, but no soybean protein is known that contains proline at 10% or greater. The molecular weight of the protein is also preferably 50,000 Da-80,000 Da. Proline is an amino acid that significantly alters the tertiary structure of a protein, and it is conjectured that the high proline content is responsible for a different tertiary structure than ordinary protein and results in strong emulsifiability.

Thus, a lower proline content will tend to provide insufficient improvement in emulsifiability, while a small protein molecular weight will lead to inferior function as a macromolecular emulsifier.

The molecular weight of the conjugate or polysaccharides referred to here may be measured by gel filtration HPLC using standard pullulan (Showa Denko K.K.) as the standard substance. Measurement of galacturonic acid was performed using a Shodex SH-1821 column (Showa Denko K.K.), and measurement of neutral sugars was performed by GLC after alditol acetate conversion. The protein molecular weight was analyzed by SDS polyacrylamide electrophoresis, and the amino acid composition was analyzed using an amino acid analyzer (L-8500A, Hitiachi, Ltd.).

The method of preparing the polysaccharides and protein conjugate of the invention is not particularly restricted, but water-soluble soybean polysaccharides may be obtained by high-temperature extraction from a soybean starting material, and especially a soybean protein-extracted residue ("okara"), in the acidic range (Patent document 1), and subsequently removing the low molecular components or impurity proteins which do not form conjugates with the polysaccharides. The resulting polysaccharides and protein bond together strongly, forming stable glycoprotein conjugates. Generally speaking, the bonds between sugars and proteins range from weak hydrogen bonds to strong glycoside bonds between serine hydroxyl groups and the reduced ends of saccharides. The bonding form in the invention product is believed to consist of fairly strong bonds since the conjugation is maintained even in the presence of denaturing agents as described below. It is conjectured that these conjugates provide the powerful emulsifiability and emulsion stability not found in the prior art.

In regard to the polysaccharides and protein, soybean protein does not increase emulsifiability when simply mixed with polysaccharides, and instead the protein constitutes an impurity that lowers the quality of the emulsifier It is essential that a specific proline-rich protein be conjugated with the polysaccharide. The protein contains at least 10% proline as the amino acid composition of the protein, as mentioned above, but in terms of the weight ratio of the polysaccharides and protein, the effect of improved emulsifiability will be reduced If the protein weight is too low, and therefore the protein content of the conjugate is preferably at least 3%. There is no particular upper limit on the protein content of the conjugate, but if it is too high the effect will not increase, and a content exceeding 50% will instead be counterproductive.

As regards the molecular weight of the conjugate, emulsifying power will be exhibited with any size of macromolecule but lower molecular weights will not provide strong emulsifying power, and the emulsifying stability will also be impaired. The molecular weight may generally be from several tens of thousand to about one million, but molecular weights of greater than 100,000 are preferred for uses requiring high emulsifying power.

An emulsifier comprising the conjugate as an active ingredient may be suitably used in emulsified flavorings instead of gum arabic, but it may also be used as an emulsifier for creams such as whipped cream or coffee whitener, or for mayonnaise or dressings.

As fats and oils to be used in the emulsion there may be mentioned animal and vegetable fats and oils such as soybean oil, corn oil, cottonseed oil, sunflower oil, carthamus oil, coconut oil, palm oil, palm kernel oil, rapeseed oil, peanut oil, rice bran oil, cacao butter, milk fat, beef tallow, lard, butter and the like, as well as processed fats and oils obtained by hardening, transesterification or separation thereof, and even fat-soluble aromas such as orange oil, lemon oil, milk flavor and the like, or waxes. The effect may be further enhanced by combination with known emulsifiers, As emulsifiers Lo be combined, there may be mentioned combinations with one or more from among lecithin, enzyme-treated lecithin, fatty acid glycerin esters and their derivatives, sorbitan fatty acid esters, propylene glycol fatty acid esters and sucrose fatty acid esters (sugar esters). The amounts of such additional components ay be 0.01-2 fold and preferably 0.02-1 fold with respect to the fat or oil. A sufficient emulsifying effect may not be achieved if they are added in very small amounts, while the flavor and texture may be impaired by increased viscosity if they are added in very large amounts.

EXAMPLES

The present invention will now be explained in greater detail by examples, with the understanding that the invention is not restricted by these examples. The "parts" and "%" values in the examples are all based on weight.

<Preparation of Water-Soluble Soybean Polysaccharides (Control)>

A two-fold amount of water was added to 100 parts of okara (80% moisture content) obtained from production of isolated soybean protein, and the pH was adjusted to 3.0 with hydrochloric acid prior to hot extraction at 120° C. for 1.5 hours. After cooling, the pH was adjusted to 5.0, centrifugation was performed (10,000 G×30 min) and the supernatant and precipitate were separated. An equivalent amount of water was added to the obtained precipitate for rinsing, and the rinsed precipitate was centrifuged again. This supernatant was pooled with the previous supernatant to obtain an extract which was then subjected to desalting by electrodialysis and purification with an active carbon column, after which it was spray dried to obtain water-soluble soybean polysaccharides A.

<Fractionation of Water-Soluble Soybean Polysaccharides (Preparation of Invention Conjugate 1)>

A 20 mL portion of a 10% aqueous solution of water-soluble soybean polysaccharides A was applied to a gel filtration column (Sephacryl S-400HR; 5.0 cm×65 cm) using 50 mM acetate buffer (pH 4.5) as the mobile phase for molecular weight fractionation, and the peak in the vicinity of 300,000

Da molecular weight was recovered, dialyzed and freeze-dried to obtain water-soluble soybean polysaccharides fraction B. The fraction was subjected to sugar detection by RT and protein detection by UV (280 nm), by which the fraction was shown to be a protein-polysaccharides conjugate. The yield of the fraction was 25% with respect to the water-soluble soybean polysaccharides A. The gel filtration chart is shown in FIG. 1.

<Fractionation of Water-Soluble Soybean Polysaccharides Fraction in the Presence of Denaturing Agent (Preparation of Invention Conjugate 2)>

A 15 mL portion of a 2% aqueous solution of water-soluble soybean polysaccharides fraction B was applied to a gel filtration column (Sepharose CL-6B; 2.5 cm×80 cm) using 1% SDS as the mobile phase, to obtain a fractionated product. Upon detecting the sugars by RI and the protein by UV (280 nm), protein was found only in the macromolecular fraction, and the macromolecular fraction was recovered and dialyzed against water to remove the denaturing agent to obtain water-soluble soybean polysaccharides fraction C. The gel filtration chart for the molecular weight fractionation in the presence of the denaturing agent is shown in FIG. 2.

<Amino Acid Composition of Protein in Soybean Polysaccharides Composition>

TABLE 1

Amino acid composition of water-soluble soybean polysaccharides composition (fraction B)

| Amino acid | Content (%) | | |
|---|---|---|---|
| | Soybean polysaccharides A | Fraction B | Fraction C |
| Asx | 10.7 | 8.1 | 6.3 |
| Thr | 5.5 | 5.0 | 4.2 |
| Ser | 6.0 | 5.4 | 4.2 |
| Glx | 18.4 | 17.0 | 14.9 |
| Gly | 7.9 | 5.2 | 3.8 |
| Ala | 9.2 | 4.8 | 3.4 |
| Val | 5.3 | 4.0 | 3.2 |
| Cys | 0.5 | 1.0 | 1.1 |
| Met | 1.0 | 2.1 | 1.6 |
| Ile | 3.2 | 3.5 | 2.8 |
| Leu | 5.1 | 5.2 | 4.4 |
| Tyr | 1.8 | 2.9 | 2.7 |
| Phe | 2.6 | 3.3 | 3.0 |
| Lys | 7.0 | 7.4 | 9.4 |
| His | 3.2 | 3.9 | 5.2 |
| Arg | 4.8 | 8.0 | 7.5 |
| Pro | 7.0 | 12.1 | 22.3 |

<Emulsifiability of Polysaccharides or Polysaccharides Conjugate>

Water-soluble soybean polysaccharides A and water-soluble soybean polysaccharides fractions B and C were used to prepare emulsions by the following method. To 25 parts of soybean oil (Refined Soybean Oil, product of Fuji Oil Co., Ltd.) there were added 75 parts of different sample solutions dissolved in 20 mM sodium citrate buffer (pH 4) to be 5%, and emulsification was carried out at 0° C. for 1 minute with an ultrasonic disruptor (Ultrasonic Disruptor 5281 by Kaijo Co.). After one hour, the emulsified particle size was measured with a laser particle size distribution meter (SALD-2000 by Shimadzu Corp.).

Comparative Example

<Emulsifiability Evaluation of Other Macromolecular Emulsifiers>

Using the same method as the aforementioned preparation of emulsions with the polysaccharides or polysaccharides conjugates, emulsions were obtained using sodium caseinate (EM-LV by DMV Co.), whey protein (Purified WPI by NZMP Co.) and gum arabic (HP grade, product of T. Hasegawa Co., Ltd.) instead of polysaccharides. One hour after preparation, the emulsified particle sizes of the emulsions were measured in the same manner with a laser particle size distribution meter (SALD-2000 by Shimadzu Corp.). The results are shown in Table 2.

TABLE 2

Emulsion evaluation results

| Sample | Emulsion particle size (μm) |
|---|---|
| Water-soluble soybean polysaccharides A | 1.33 |
| Water-soluble soybean polysaccharides fraction B | 0.90 |
| Water-soluble soybean polysaccharides fraction C | 0.76 |
| Sodium caseinate | 31.32 |
| Whey protein | 3.51 |
| Gum arabic | 1.90 |

The proline-rich water-soluble soybean polysaccharides fractions B and C were confirmed to be satisfactory emulsions with much higher emulsifying power than the other macromolecular emulsifiers, and smaller particle sizes than the conventionally known soybean water-soluble polysaccharides A. Emulsified particle size differs even for the same emulsifier and emulsion composition, depending on the emulsifying conditions. Thus, comparison of the emulsified particle sizes under the same emulsifying conditions allows comparative judgment of the emulsifiability of each emulsifier.

<Composition of Water-Soluble Soybean Polysaccharides Fraction B>

The composition of the water-soluble soybean polysaccharides fraction B is shown in Table 3 below.

TABLE 3

Composition of water-soluble soybean polysaccharides fraction B

| Component | Dry content (%) |
|---|---|
| Saccharides | 81.6 |
| Protein | 3.1 |
| Other | 15.3 |

| Saccharide component | Content in sugar (%) |
|---|---|
| Rhamnose | 10.5 |
| Fucose | 1.8 |
| Arabinose | 19.3 |
| Galactose | 40.6 |
| Xylose | 2.6 |
| Glucose | 2.0 |
| Galacturonic acid | 23.2 |

<Reference Experiment>

The following reference experiment was carried out to demonstrate the properties of the polysaccharides and protein conjugate.

<Protease Decomposition and Emulsifiability of Water-Soluble Soybean Polysaccharides Fraction B>

To 80 g of a 5% aqueous solution of water-soluble soybean polysaccharides B there was added 0.5 ml (13.6 kunits) of a trypsin aqueous solution (from bovine pancreas, Sigma Co.), and reaction was conducted at pH 7, 30° C. After 1, 3, 6 and 24 hours, the enzyme was inactivated by heating at 90° C. for 20 minutes, 20 g of soybean oil was added for 5 minutes of pre-emulsification with a Power Gen125, and then main emulsification was carried out with a homogenizer (Emuisi-Flex-C5, Avestin Co.) at 40 Mpa. The particle size of the emulsion was measured with a Mastersizer X (Malvern Instruments Ltd), yielding the results shown in Table 4. The trypsin-added water-soluble soybean polysaccharides A increased in particle size with time, losing its emulsifiability. This result suggests that protein plays an important role in the emulsifiability of water-soluble soybean polysaccharides.

TABLE 4

| Enzyme treatment time (h) | Emulsion particle size (μm) |
|---|---|
| 0 | 0.52 |
| 1 | 0.81 |
| 3 | 2.15 |
| 6 | 4.49 |
| 24 | 9.83 |

<SDS-Polyacrylamide Electrophoresis of Water-Soluble Soybean Polysaccharides Fraction C>

The sugar chains of water-soluble soybean polysaccharides fraction C were decomposed using an enzyme (Hemicellulase M, product of Tanabe Seiyaku Co., Ltd.) to obtain water-soluble soybean polysaccharides decomposition product D. When fraction C and decomposition product D were applied to SDS-polyacrylamide electrophoresis, fraction C was found to be a macromolecular component that completely failed to enter the gel, while the decomposition product D showed three protein bands at 52,200 Da, 60,400 Da and 78,500 Da. This is Illustrated In FIG. 3.

The water-soluble soybean polysaccharides fraction C had very powerful emulsifiability, and even with gel filtration in the presence of SDS the polysaccharides and protein composing the conjugate failed to dissociate and behaved as a macromolecular fraction which also failed to enter the gel in SDS electrophoresis, while the decomposition product D obtained by enzyme decomposition of the polysaccharides showed three clear protein bands. Consequently, It was concluded that fraction C and its constituent fraction B are the sources of emulsifiability, and that the conjugate consisted of the polysaccharides and protein in strong linkage. In addition, with the high galacturonic acid content in the sugar composition of fraction B, it is believed that the highly polar sugar chains increased the electrostatic repulsion and thereby further stabilized the emulsion.

Furthermore, the constituent amino acids of the protein include abundant proline, and this is significantly different from the constituent protein of gum arabic that is rich in hydroxyproline and serine.

BRIEF DESCRIPTION OF THE DRAWINGS

FIG. 1 is a graph showing the gel filtration chart for water-soluble soybean polysaccharides A.

FIG. 2 is a graph showing the gel filtration chart for water-soluble soybean polysaccharides fraction B with molecular weight fractionation in the presence of a denaturing agent.

FIG. 3 is a photograph from electrophoresis of water-soluble soybean polysaccharides fraction C.

The invention claimed is:

1. A conjugate comprising soybean protein having an amino acid composition with at least 10% by weight proline, and soybean polysaccharides.

2. A conjugate according to claim 1, wherein the molecular weight of the protein forming the conjugate has as its major constituent component a fraction with molecular weight of 50,000 Da to 80,000 Da.

3. A conjugate according to claim 1, wherein the protein forming the conjugate is present at 3% by weight or greater in the conjugate.

4. A conjugate according to claim 1, wherein the polysaccharides forming the conjugate are acidic polysaccharides containing at least 20 wt % galacturonic acid.

5. A conjugate according to claim 1, wherein the molecular weight of the conjugate is 100,000 Da or greater.

6. An emulsifier comprising a conjugate according to claim 1 as the active ingredient.

7. An emulsion containing a conjugate according to claim 1.

* * * * *

UNITED STATES PATENT AND TRADEMARK OFFICE
CERTIFICATE OF CORRECTION

PATENT NO. : 7,601,381 B2
APPLICATION NO. : 11/571953
DATED : October 13, 2009
INVENTOR(S) : Akihiro Nakamura et al.

It is certified that error appears in the above-identified patent and that said Letters Patent is hereby corrected as shown below:

Title Page, insert the following:

-- (30) Foreign Application Priority Data

July 13, 2004 (JP) ........................ 2004-205351 --.

Signed and Sealed this

Twenty-fifth Day of May, 2010

David J. Kappos
*Director of the United States Patent and Trademark Office*